United States Patent [19]

Phillips, Jr. et al.

[11] 4,310,060
[45] Jan. 12, 1982

[54] APPARATUS FOR MONITORING THE BLEND OF FIBERS

[75] Inventors: Samuel B. Phillips, Jr.; John M. Cochran, both of Greenville, S.C.

[73] Assignee: Phillips Textile Marketing Co., Inc., Greenville, S.C.

[21] Appl. No.: 167,645

[22] Filed: Jul. 11, 1980

[51] Int. Cl.³ .................. G01G 19/22; G01G 23/38; G01G 13/16; G01G 13/18

[52] U.S. Cl. ........................................ 177/70; 177/2; 177/59; 177/113

[58] Field of Search ............... 177/2, 58, 59, 70, 105, 177/106, 113, DIG. 3

[56] References Cited

U.S. PATENT DOCUMENTS 3,430,721 3/1969 Harmon et al. ..................... 177/2
3,595,328 7/1971 Griem, Jr. ........................ 177/70 X Primary Examiner—George H. Miller, Jr.
Attorney, Agent, or Firm—Bailey, Dority & Flint

[57] ABSTRACT

An apparatus for monitoring the blend of fibers being dropped onto a receiver by a plurality of weigh pans responsive to predetermined weights of the fibers being accumulated in the respective weigh pans. An electrical signal is produced when predetermined weights of fibers are loaded into the weigh pans. Each of the weigh pans is equipped with a monitoring circuit which includes load cells operably connected to respective weigh pans which generate an analog signal indicating the weight of the fibers accumulated in the weigh pan. An analog to digital converter converts the analog signal and responsive to being triggered is fed into a latch circuit that is triggered by the electrical signal produced when all of the hoppers are full. A digital to analog converter is connected to the latch circuit and converts the digital signal back to an analog signal that is recorded on a chart recorder.

A subtractor is connected to the analog to digital converter for subtracting a value from the digital signal corresponding to the weight of the respective pans so as to produce a net weight of the fibers prior to being recorded and displayed on a visual display.

6 Claims, 7 Drawing Figures

APPARATUS FOR MONITORING THE BLEND OF FIBERS

BACKGROUND OF THE INVENTION

In normal blending operations, fibers are fed by means of lift aprons from hoppers into weigh pans. Positioned below the lift aprons are weigh pans that are equipped with counter balance arms that may be set to control the amount of fibers deposited on a conveyor belt positioned therebelow. When all of the weigh pans are loaded with a predetermined weight of fibers, a signal is produced that causes the weigh pans to simultaneously drop the fibers onto the conveyor belts. When the fibers are being dropped onto the conveyor belts, a drive mechanism associated with the conveyor is energized causing the conveyor to advance a predetermined distance. Normally, this distance is at least the separation of the weigh pans. One particular apparatus for feeding textile fibers utilizing weigh pans is disclosed in U.S. Pat. No. 3,132,709 granted on May 12, 1964 to K. G. Lytton. Usually there are from four to six weigh pans provided over the conveyor, however, there can be any number depending on the particular blend being desired.

In order to ensure that the particular weigh pans are dropping the desired amount of fibers on each drop, an operator normally checks the weight by collecting the fibers produced by a particular drop and weighing such on a scale. This, of course, is very time consuming and is only as accurate as the care taken by the person performing the weighing operation in collecting all of the fibers that were dropped, and upon the frequency of the weigh operations. If the weigh pan, for example, malfunctions soon after the fibers are manually weighed, then a blend would be out of tolerance until the next weighing takes place.

Apparently, there have been many attempts to solve the problem of monitoring the flow of fibers from a plurality of hoppers to a conveyor in order to control the blend, however, applicant is not aware of any such devices that have been made commercially available on the market. An example of such a device is disclosed in U.S. Pat. No. 3,918,539 which discloses a weighing system for the weigh pans. In U.S. Pat. No. 3,494,507, there is disclosed still another metering apparatus for use in conjunction with fiber feeding devices.

U.S. Pat. No. 3,985,266 discloses apparatus for controlling the feed rate and batch size of material being fed. This device takes into consideration the weight of the fibers being supplied as well as the speed of the conveyor. Other patents of similar interest include U.S. Pat. Nos. 3,939,929, 4,000,541, 3,889,319, 3,960,225, 3,957,126, and 4,038,531.

SUMMARY OF THE INVENTION

Accordingly, it is an important object of the present invention to provide an apparatus for monitoring the blend of fibers by constantly measuring the amount of fibers dropped by a plurality of weigh pans onto a conveyor and recording the weight of the fibers dropped by the respective weigh pans and if the weight of the fibers is outside of a predetermined tolerance, activating an alarm.

Still another important object of the present invention is to provide a monitoring system for use on conventional weigh pan apparatus for monitoring the amount of fibers being dropped by the weigh pans.

Still another important object of the present invention is to provide a monitoring system which produces a permanent record showing the precise amount of fibers being dropped by a plurality of weigh pans to form a blend.

In accordance with the present invention, an apparatus is provided for monitoring the amount of fibers dropped by a plurality of weigh pans to form a blend. Each of the weigh pans have doors provided on the bottom thereof which are automatically opened responsive to all of the weigh pans receiving a predetermined amount of fibers from the aprons positioned thereabove. Normally, the amount of fibers that are desired to accumulate is controlled by a weigh bar and when the weigh bar indicates the weigh pan has received the desired amount of fibers, a signal is produced preventing any additional fibers from being deposited into the weigh pan. Upon all of the weigh pans receiving the desired or predetermined amount of fibers, a signal is generated causing all of the weigh pans to drop simultaneously.

Each of the weigh pans is supported by a pair of load cells that generate an electrical signal indicating the gross weight of the fibers in the weigh pan and the weight of the weigh pan. The load cells produce analog signals corresponding to the gross weight which is fed to an analog to digital converter that converts these signals into digital signals. These digital signals are, in turn, fed to a subtractor which has been preset to subtract the weight of the weigh pan from the gross signal.

The subtractor has a pair of outputs. One output is fed directly to a visual display panel indicating the net weight of the fibers collected by a weigh pan immediately prior to dropping of the fibers. The other output signal from the subtractor is fed to a latch control circuit. Upon receiving a latch control signal that is produced when all of the weigh pans have been loaded to their respective predetermined weight of fibers, the digital signal representing net weight of fibers is latched into the latch circuit and subsequently fed through a digital to analog converter which converts the signal back to an analog signal. This analog signal is, in turn, fed to a chart recorder.

The chart recorder is provided with knobs that adjust the upper and lower tolerances for the particular drop. If the signal is outside these tolerances, an alarm circuit is activated causing an alarm to be produced.

The latch signal is initially produced by the conventional weigh bar system responsive to all of the weigh pans reaching their predetermined level. This electrical signal is, in turn, fed through an optical isolator which isolates the electrical noise from the latch signal. After the latch signal passes through the optical isolator, it is fed through a Darlington circuit and on to the latch control circuit.

DESCRIPTION OF A PREFERRED EMBODIMENT

Figure 1:
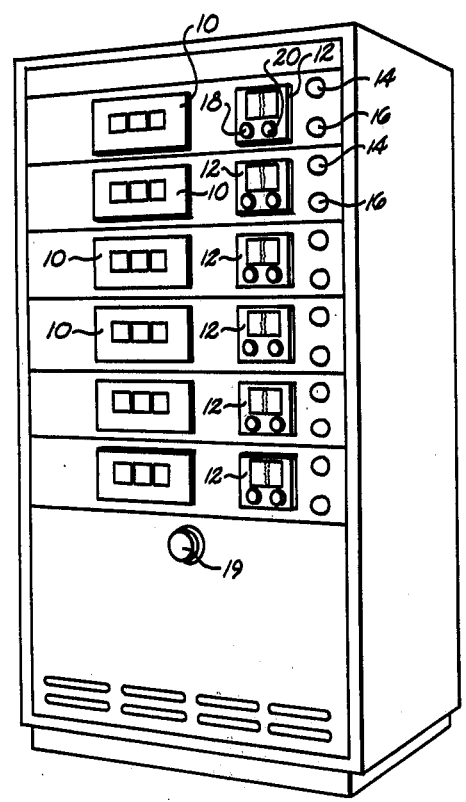
FIG. 1 is perspective view illustrating an apparatus constructed in accordance with the present invention located in a panel box for monitoring six weigh pans.

Referring to FIG. 1, there is illustrated a control panel for the circuitry used in monitoring the weight of fibers being dropped by a plurality of weigh pans onto a receiver. Positioned on the front of the control panel are a plurality of digital readout windows 10 and a plurality of chart recorders 12. Each weigh pan that is dropping fibers onto the conveyor has its own digital readout and chart recorder. Positioned adjacent the side of each of the chart recorders 12 are lamps 14 and 16. The lamp 14 is illuminated when the drop exceeds a predetermined weight, and the lamp 16 is illuminated when it is less than a predetermined weight. The tolerance levels for illuminating the lamps 14 and 16 are controlled by the knobs 18 and 20, respectively. When any of the lamps are illuminated, a master lamp or alarm 19 is activated for bringing the out-of-tolerance condition to the attention of the room operator.

Figure 2:
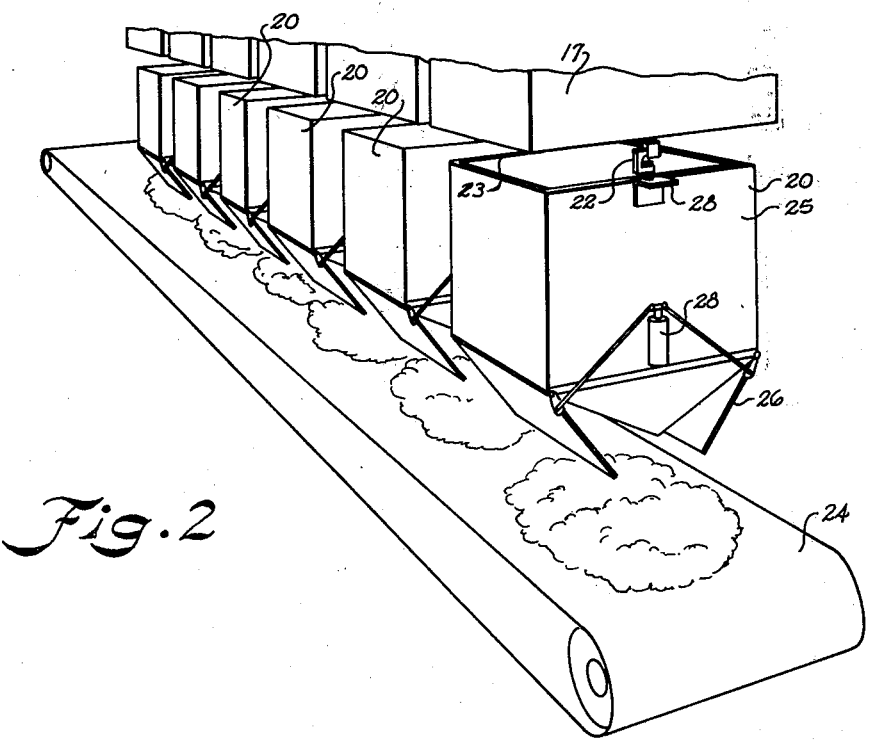
FIG. 2 is a perspective view illustrating conventional weigh pans equipped with load cells in accordance with the present invention dropping fibers onto a fiber feed conveyor.
Figure 3:
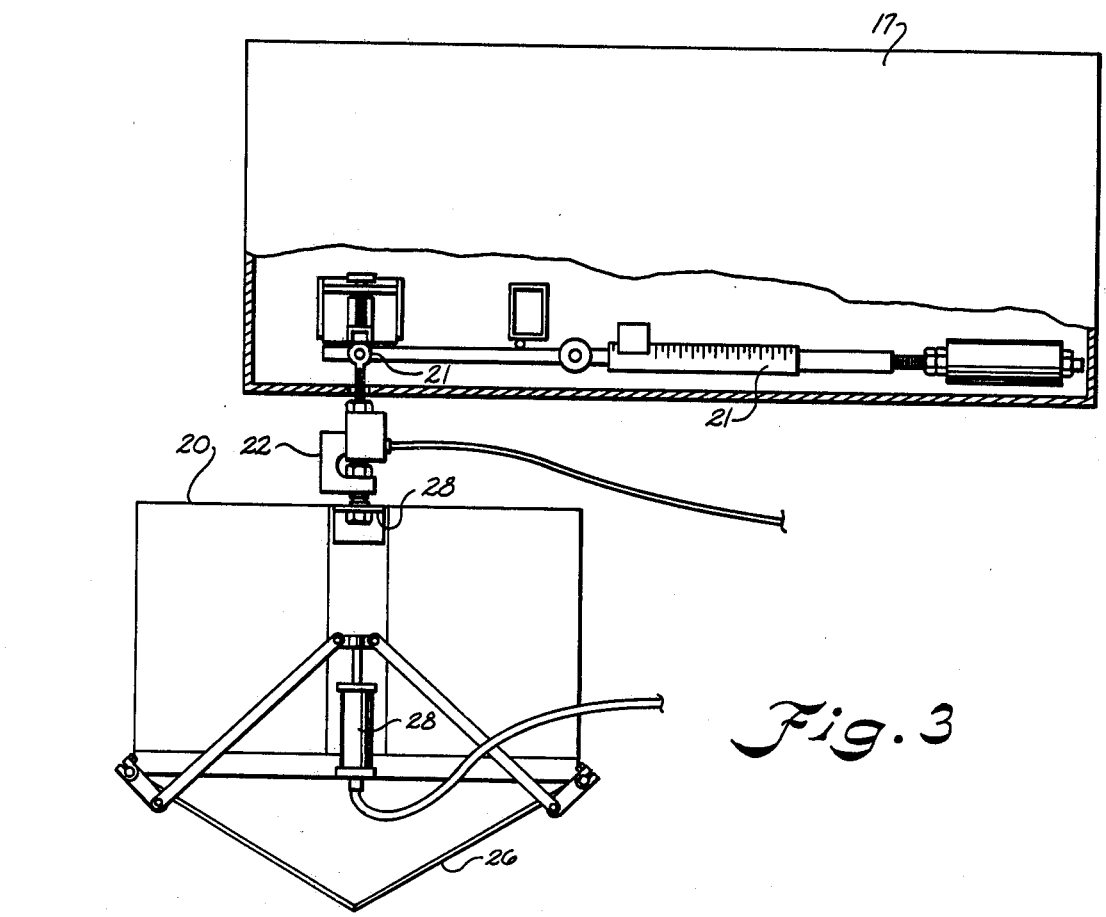
FIG. 3 is a side elevational view illustrating the manner in which the load cells support the conventional weigh pan.

Referring in more detail now to FIGS. 2 and 3 of the drawing, there is illustrated a portion of conventional feed hoppers 17 from which fibers are fed by means of lift aprons, not shown. The lift aprons lift the fibers from the hoppers 17 and the aprons, in turn, feed the fibers into conventional weigh pans 20 positioned directly therebelow. Each of the hoppers 17 is provided with a balance arm assembly 21, details of which will not be discussed fully since it is a conventional item and is illustrated in U.S. Pat. No. 3,132,709. This balance arm assembly 21 may be adjusted so that when a predetermined weight of fibers are deposited into the weigh pan, a signal is produced stopping the flow of fibers therein and when all of the weigh pans of the line are full, the fibers are dropped onto a conveyor 24 positioned therebelow.

In FIG. 2, the doors 26 of the weigh pan 20 are shown in an open position whereas in FIG. 3 the doors of the weigh pan are shown in a closed position. The doors are operated by means of a pneumatic cylinder 28 provided on the side of the weigh pan.

The weigh pans 20 are supported by means of a pair of load cells 22 which are attached to the opposite walls 25 and 23 of the weigh pan. Only one of the load cells is illustrated, however, it is to be understood that a similar load cell is provided on the wall 23 and extends between a bracket 28 and the pivotal balance arm 21. On the side of the hopper 17 directly above the side 23 of the weigh pan 20 there is another pivotal arm that operates in conjunction with the balance arm 21. The hoppers 17, weigh pans 20, and lift aprons are conventional items, and the operation of them are not modified by the apparatus forming part of the subject invention.

There is a conventional control circuit for controlling the loading and dumping of the weigh pans, however, such is not illustrated since it is well known and does not form part of the subject invention.

Figures 4, 6:
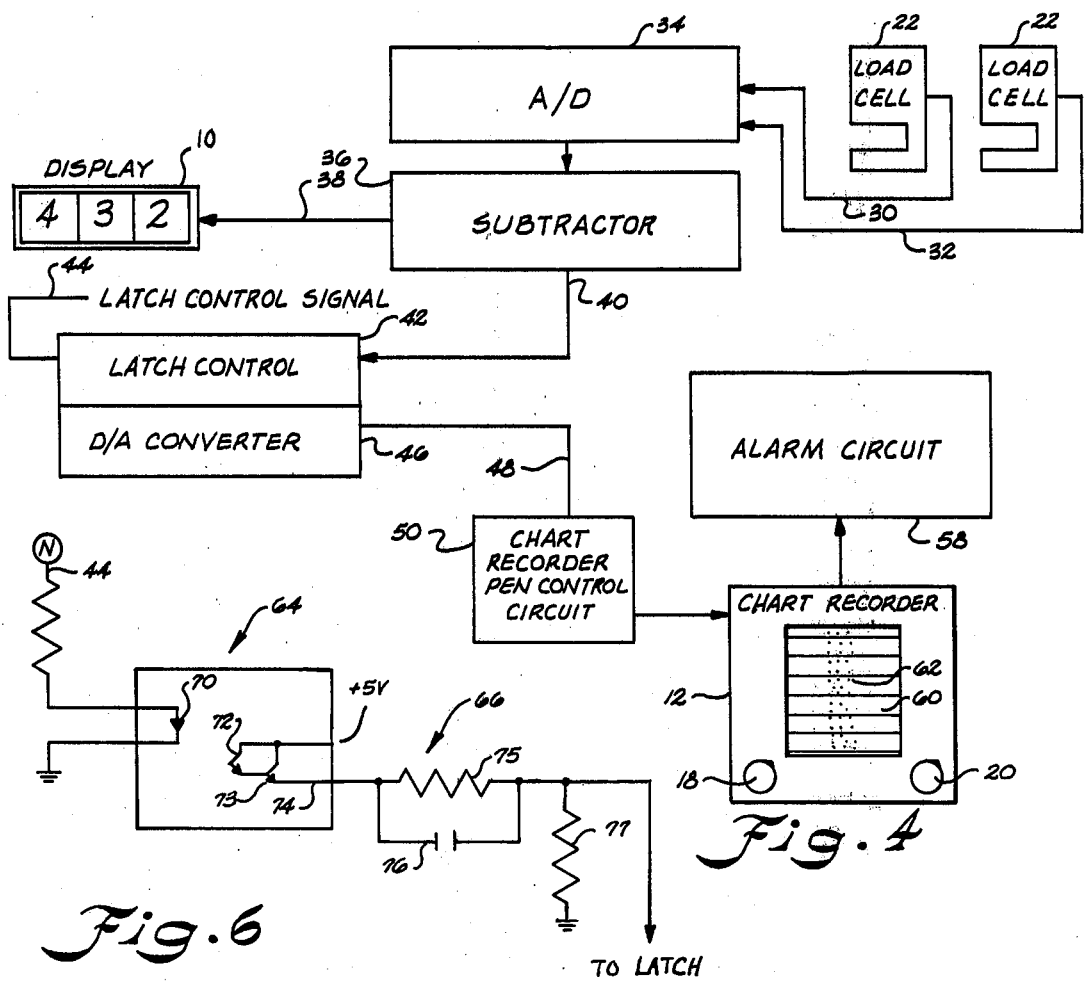
FIG. 4 is a block diagram of an apparatus constructed in accordance with the present invention.
FIG. 6 is a schematic diagram illustrating the circuit for conditioning the latch signal.

As shown in FIG. 4 of the drawing, the output of the two load cells 22 produce analog signals on output lines 30 and 32 which represents the gross weight of a particular weigh pan and the fibers loaded therein. These signals are in turn fed to an analog to digital converter 34 which converts the signal into a composite digital signal. A subtractor 36 is connected to the output of the analog to digital converter 34 for subtracting a value from the digital signal representing the weight of the weigh pan. The subtractor has a pair of output leads 38 and 40. Output lead 38 is fed directly to a display panel 10 which visually displays the net weight of the fibers being loaded into the weigh pan in ounces and tenths of ounces.

The digital signals appearing on output leads 38 and 40 change constantly as the fibers are being loaded into the weigh pan and the reading produced by the digital display 10 varies accordingly.

In order to produce a permanent record of the total weight of the fibers dropped each time the doors on a particular weigh pan are opened and drops fibers onto conveyor, an additional control circuit is required to which the output lead 40 is connected.

The digital signal representing the net fibers appearing on lead 40 is fed to a latch control circuit 42. When all of the weigh pans have been loaded with a predetermined weight of fibers, a signal is produced by the conventional circuitry associated with the weigh pans indicating that all of the weigh pans are ready to drop. After a short delay built into the circuit, all of the weigh pans drop the fibers on the conveyor belt 24 simultaneously. This signal is used as a latch control signal for triggering the latch control circuit 42. Upon triggering of the latch control circuit 42, the digital reading that is supplied thereto is latched or stored into the circuit. This represents the net weight of the fibers being dropped by a particular weigh pan.

A digital to analog converter 46 is connected to the latch control circuit 42 for converting the digital signal latched therein back to an analog signal. The analog signal produced by the digital to analog converter 46 is fed out over lead 48 to a chart recorder pen control circuit 50. According to the amplitude of this analog signal, the pen associated with a chart recorder 12 is deflected and records the weight of the drop in the form of a mark on the chart paper 60.

The chart recorder 12 is a conventional chart recorder provided with adjustable knobs 18 and 20. These knobs are utilized for setting the maximum and minimum tolerances allowed for each drop. If the weight of the fibers dropped is below the minimum setting of knob 18, or above the maximum setting of knob 20, then a respective lamp 14 or 16 is illuminated and an alarm is activated by an alarm circuit 58. When the alarm circuit is activated, the lamp 19 is illuminated along with one of the lamps 14 or 16 indicating an out-of-tolerance condition. Other conditional responsive alarms such as horns can be used for attracting the attention of the operator in the room.

The chart recorder 12 includes a movable sheet of recording paper 60 upon which the marks 62 are printed, and from reviewing the location of the marks on the paper, the weight and time of each particular drop can be precisely determined.

It is to be understood that each of the weigh pans is provided with a circuit such as shown in FIG. 4, and they operate independently of each other.

Figure 7:
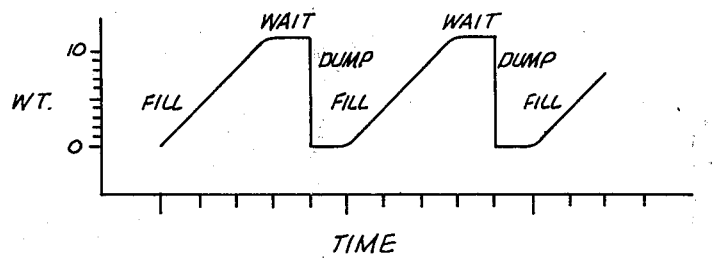
FIG. 7 is a weight time chart illustrating the dump cycles of a particular weigh pan.

Referring now to FIG. 7 of the drawing, there is illustrated a weight-time graph showing the cycle for filling a weigh pan and dropping the fibers. The first incline line on the chart represents the net weight of the fibers as a particular weigh pan is being filled. When it reaches the preset amount, it then goes into a wait period represented by the horizontal line. It is during this wait period that the latch control signal that appears on input line 44 of the latch control circuit is produced. The vertical line after the wait period represents the dumping of the fibers onto the conveyor 24 positioned below the weigh pans. After the dumping operation, there is built in another short delay prior to the cycle being repeated.

Figure 5:
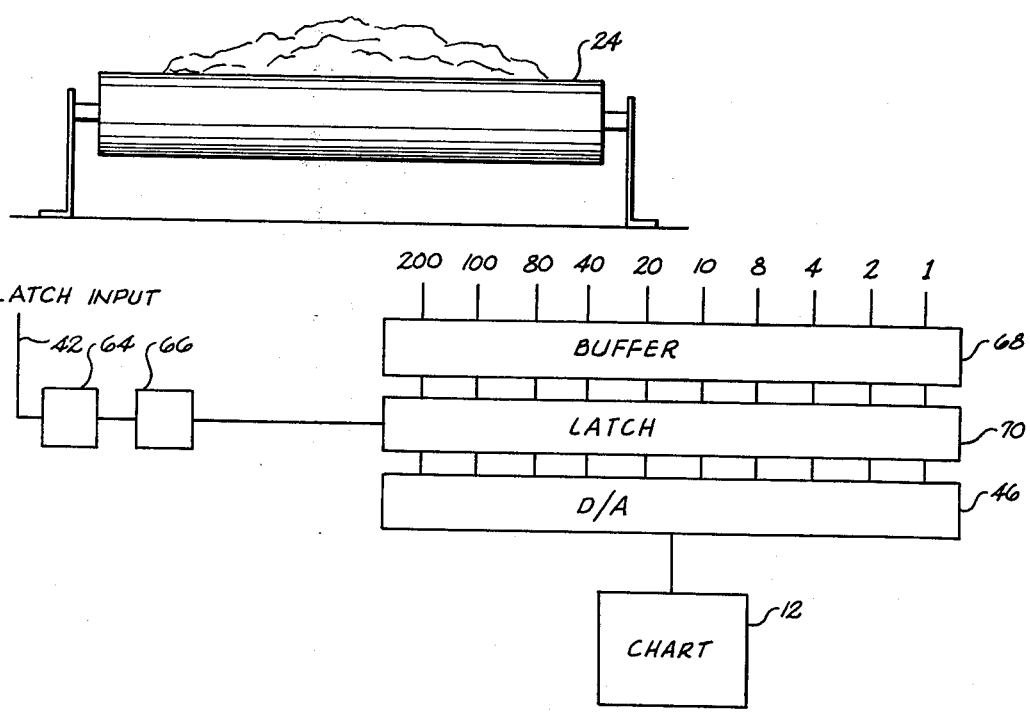
FIG. 5 is a more detailed diagram illustrating the latch control circuit and digital to analog converter forming part of the circuit of FIG. 4.

Referring now to FIG. 5 of the drawing, there are illustrated details of the latch control circuit 42 and the digital to analog converter 46.

As previously mentioned, from the conventional control circuit associated with the weigh pan and hopper, a latch signal is fed in over lead 44 when all of the weigh pans 20 have been loaded with their respective preset amount of fibers. The latch signal appearing on lead 44 is first fed through an optoisolator circuit 64 to a differentiating circuit 66. The purpose of optoisolator 64 and the differentiating circuit 66 is to produce a momentary signal responsive to the latch signal appearing on input line 44 indicating that the weigh pans are about to drop.

At this point in the operation, a digital signal in the form of a binary coded decimal signal is being fed from the subtractor 36 into ten input leads associated with a buffer circuit 68. The least significant bit shown on the top right hand of the buffer circuit 68 represents one-tenth of an ounce, and the most significant bit shown on the left hand represents two hundred tenths of an ounce or twenty ounces. The buffer circuit 68 conditions the binary coded decimal signal and amplifies this signal and, in turn, feeds the binary coded decimal signal into the latch circuit 70 responsive to the latch circuit 70 being triggered by a signal being fed from the differentiating circuit 66. The latch circuit 70 is provided for receiving the signals from the buffer 68 immediately prior to dumping of the fibers from the weigh pan and causing such signal representing net weight of fibers to be stored or latched in the latch circuit 70. This stored or latched signal is then fed to a digital to analog converter 46 and subsequently fed to the chart recorder 12.

Any suitable buffer, latch circuit, or digital to analog converter can be utilized.

As previously mentioned, the recording pen is deflected according to the amplitude of the analog signal being fed out of the digital to analog converter 46 which represents the net weight of the fibers being dropped by the particular weigh pan.

In FIG. 6, there is illustrated in more detail the optoisolator 64 and differentiating circuit 66. The latch signal is fed in over lead 44 to a light emitting diode 70 which, in turn, converts the electrical signal to an optical signal. This optical signal is fed to the base of a first transistor 72 of a Darlington circuit. The base electrode associated with transistor 72 converts the light signal back to an electrical signal causing current to flow to a second transistor 73 which, in turn, produces an output current on lead 74. Lead 74 is, in turn, connected to the differentiating circuit 66 which includes resistor 77 and capacitor 76 which is connected in parallel with still another resistor 75. The resistor 75 discharges capacitor 76 when no signal is present. The spikes produced by the differentiating circuit are, in turn, used as the latching signal that is fed to the latch control circuit 42.

In summarizing the operation of the monitoring circuit, each of the respective weigh pans 20 has associated therewith a digital readout window 10 and a chart recorder 12. The digital readout window 10 indicates the actual weight that is present in the weigh pan at all times. The chart recorder on the other hand records the weight of each drop of fibers onto the conveyor 24. If the net weight of the fibers is outside predetermined tolerances, alarms are activated.

While a preferred embodiment of the invention has been described using specific terms, such description is for illustrative purposes only, and it is to be understood that changes and variations may be made without departing from the spirit or scope of the following claims.

What is claimed is:

1. An apparatus for monitoring the blend of fibers being dropped onto a receiver by a plurality of weigh pans responsive to predetermined weights of said fibers being accumulated in said respective weigh pans comprising:

load cell means operably connected to each weigh pan generating an analog signal indicating the weight of said fibers accumulated in said weigh pan;

an analog to digital converter means converting said analog signal produced by said load cell means to a digital signal;

a digital display means for each of said weigh pans;

means for supplying said digital signal representing the weight of fibers in a respective weigh pan to one of said digital display means producing a visual display of the weight of said fibers;

a chart recorder for each of said weigh pans;

a digital to analog converter means connected to the output of said analog to digital converter means for converting said digital signal back to an analog signal and supplying said analog signal to said chart recorder, and latch control means causing said analog signal being supplied to said chart recorder to record the full weight of fibers in a respective pan just prior to said fibers being dropped on said receiver.

2. The apparatus as set forth in claim 1 further comprising:

alarm means provided on said recorder being activated responsive to the weight of said fibers being recorded being less than or exceeding predetermined weights.

3. The apparatus as set forth in claim 1 further comprising:

a subtractor means forming part of said analog to digital converter means for subtracting a value from said digital signal produced by said analog to digital converter corresponding to the weight of said respective weigh pan so that the digital signal fed to said digital display represents the net weight of the fibers in said weigh pan.

4. The apparatus as set forth in claim 1 further comprising:

said latch control means including, (i) a buffer circuit receiving said digital signals from said analog to digital converter;

(ii) a latch circuit connected to an output of said buffer circuit;

(iii) means for supplying a latch signal to said latch circuit causing said digital signal present in said buffer circuit to be latched into said latch circuit immediately prior to said weigh pan dropping said fibers on said receiver, and means for connecting said analog to digital converter means to said latch circuit.

5. An apparatus for monitoring the blend of fibers being dropped onto a receiver by a plurality of weigh pans responsive to predetermined weights of said fibers being accumulated in said respective weigh pans, an electrical circuit connected to said weigh pans generating an electrical signal responsive to said predetermined weights of fibers being loaded into said weigh pans comprising:

a monitoring circuit provided for each of said weigh pans including:
 (i) load cell means operably connected to a respective weigh pan generating an analog signal indicating the weight of fibers accumulated in said weigh pan;
 (ii) an analog to digital converter means converting said analog signal to a digital signal;
 (iii) a latch circuit connected to receive and latch said digital signal therein upon being triggered;
 (iv) means for supplying said electrical signal produced responsive to said predetermined weight of fibers being loaded into said weigh pans to said latch circuit for triggering said latch circuit;
 (v) a digital to analog converter means connected to said latch circuit for converting said digital signal latched into said latch circuit to an analog signal, and
 (vi) a chart recorder recording said analog signal produced by said digital to analog converter means.

6. The apparatus as set forth in claim 1 further comprising:
a subtractor means connected between said analog to digital converter means and said latch circuit subtracting a value from said digital signal corresponding to the weight of said respective weigh pan.

* * * * *